United States Patent
Mizuno

[19]

[11] Patent Number: 6,084,845
[45] Date of Patent: Jul. 4, 2000

[54] OPTICAL HEAD AND AN OPTICAL DISK APPARATUS

[75] Inventor: Sadao Mizuno, Ibaraki, Japan

[73] Assignee: Matsushita Electric Industrial Co., Ltd., Osaka, Japan

[21] Appl. No.: 09/087,841

[22] Filed: May 29, 1998

[30] Foreign Application Priority Data

May 30, 1997 [JP] Japan ..................................... 9-142655

[51] Int. Cl.[7] ........................................................ G11B 7/09
[52] U.S. Cl. .................. 369/112; 369/44.14; 369/44.37; 369/94
[58] Field of Search ..................................... 369/112, 110, 369/111, 103, 116, 44.12, 44.14, 44.37, 93, 94, 54, 58

[56] References Cited

U.S. PATENT DOCUMENTS

| | | | |
|---|---|---|---|
| 5,235,581 | 8/1993 | Miyagawa et al. ................. | 369/112 X |
| 5,703,856 | 12/1997 | Hayashi et al. . | |
| 5,982,732 | 11/1999 | Yamanaka ............................... | 369/112 |

FOREIGN PATENT DOCUMENTS 0 747 893  12/1996  European Pat. Off. .

63-052341  3/1988  Japan .

OTHER PUBLICATIONS

European Search Report for Int'l Appln No. 98109896 dated Dec. 9, 1998.

*Primary Examiner*—Muhammad Edun
*Attorney, Agent, or Firm*—Ratner & Prestia

[57] ABSTRACT

An optical head has a first light source; a second light source; a transmitting and reflecting element having a first surface and a second surface, and used to reflect diverging light from the first light source at the first surface, and to allow diverging light from the second light source to enter the second surface and to go out from the first surface, thereby to synthesize optical paths; an objective lens for converging light from the transmitting and reflecting element on an information recording surface of an optical disk and for condensing light reflected from the disk; and a photo-detector for receiving the reflected light, wherein the first surface and the second surface of the transmitting and reflecting element are not parallel to each other in order to decrease aberration when the diverging light from the second light source passes through the transmitting and reflecting element.

18 Claims, 11 Drawing Sheets

Incident angle: center of optical axis − 7 degrees

Incident angle: center of optical axis

Incident angle: center of optical axis + 7 degrees

OPTICAL HEAD AND AN OPTICAL DISK APPARATUS

TITLE OF THE INVENTION

An optical head and an optical disk apparatus

BACKGROUND OF THE INVENTION

1. Field of the Invention

The present invention relates to an optical head and an optical disk apparatus for optical recording or reproduction of information on an optical disk.

2. Related Art of the Invention

An objective lens used for an optical head has been designed in consideration of the substrate thickness of an optical disk. Therefore, if the objective lens is used for an optical disk having a substrate thickness different from the design value, spherical aberration occurs and the convergence performance of the lens is lowered, thereby making recording and reproduction difficult. Conventionally, all of compact disks (CD), video disks and magneto-optical disks for data have a substrate thickness of 1.2 mm. Therefore, only one kind of objective lens can be used, and recording and reproduction can be accomplished on different kinds of optical disks by using only one optical head.

In the case of recently standardized digital video disks (DVD), the numerical aperture of the objective lens is increased, and the wavelength of the light source is shortened.

When the numerical aperture is increased, optical resolving power is raised, and the frequency band for recording and reproduction can be widened. However, if the optical disk is tilted, a problem of increased comatic aberration is caused. This problem is unavoidable since the problem is caused when the optical disk itself is warped, when the turntable wobbles, or even when dirt is present between the optical disk and the turntable. Comatic aberration due to the tilt is proportional to the third power of the numerical aperture and the substrate thickness. Therefore, even when the substrate thickness of an optical disks is unchanged, if the numerical aperture is raised, the aberration is increased, and the convergence performance is not raised. In the case of DVD, in order not to increase the comatic aberration even when the numerical aperture of the objective lens is increased, the substrate thickness of the optical disk is made smaller up to 0.6 mm, thereby reducing such an adverse effect. When the substrate thickness of the optical disk is made smaller as described above, however, nothing can be recorded and reproduced on the above-mentioned conventional thick optical disk by using an objective lens produced for the thin optical disk, whereby no compatibility can be maintained between the conventional optical disk and the thin optical disk.

Furthermore, in the case that a short wavelength of 650 nm is used, the numerical aperture of the objective lens can be increased, and the optical resolving power can be raised, whereby the frequency band for recording or reproduction can be widened. However, if the conventional optical disk having been set to be usable at a wavelength of 780 to 830 nm is played back by using a semiconductor laser with a shorter wavelength (650 nm), a problem of being unable to obtain any sufficient reproduction signal or control signal is caused due to differences in the reflectance, absorbance and the like of the recording surface. This problem is significant in CD-R, for example, which has been standardized as a rewritable CD. Originally, the CD-R has been standardized so that its reflectance is 65% or more at 775 to 820 nm. However, the reflectance drops extremely at wavelengths other than the standard range, and the absorbance increases. At a wavelength of about 650 nm, the reflectance may decrease to about one-eighth and the absorbance may increase about eight times in comparison with the standard values. In such a case, even when reproduction is attempted by applying the standard power, recorded data may be erased by the absorption of light, instead of being reproduced.

In order to solve these problems, a method using two light sources, such as that shown in FIGS. 11 to 16, has been devised conventionally. FIGS. 11, 12, 13 and 14 are views showing the configuration of a conventional optical head in accordance with this method. FIGS. 11 and 13 show the case when a high-density optical disk 8 having a substrate thickness of 0.6 mm is played back, and FIGS. 12 and 14 show the case when an optical disk 13 having a substrate thickness of 1.2 mm is played back. FIG. 13 is a perspective view of FIG. 11, and FIG. 14 is a perspective view of FIG. 12. FIG. 15 is a view showing the configuration of the module of the conventional optical head, and FIGS. 16a, 16b and 16c are graphs showing the characteristics of an optical film used for the head. FIG. 16a shows the transmittance of the film at an incident angle of 45–4.6°; FIG. 16b shows the transmittance at an incident angle of 45°; and FIG. 16c shows the transmittance at an incident angle of 45+4.6°. The module mentioned in the present specification refers to an integrated combination of at least a semiconductor laser and a photo-detector.

Referring to FIG. 11, a light beam 42 with a wavelength of 650 nm emitted from the semiconductor laser 41a of a first module 41 passes through a hologram 41c, and enters a compound prism 43. Since the polarization direction of the light beam 42 is the longitudinal direction of the module 41 just as in the case of a second module 51 shown in FIG. 15, the light beam 42 enters the compound prism 43 as s-polarized light. An optical film 44 having the characteristics shown in FIGS. 16a, 16b and 16c is formed on the junction surface of the compound prism 43. Since the light beam 42 is used within a spread angle in the range of −7 to +7°, the compound prism 43 is configured so that the light beam 42 inside the glass of the compound prism 43 passes through the optical film 44 at least in the range of 45 −4.6 to 45+4.6°. Therefore, since the s-polarized light passes through in the angle range, the light beam 42 entering as diverging light passes through the compound prism 43, and is condensed by a condenser lens 45 to become a nearly parallel lightbeam. The condensed light beam 42 is reflected by a mirror 46, passes through an aperture limitation means 47, and is focused on an image formation point p by an objective lens 48 to form a light spot 49 on the recording surface of the optical disk 8. This aperture limitation means 47 is configured so as to allow light with a wavelength of 650 nm to pass through totally, and so as to allow light with a wavelength of 780 nm to pass through only the internal portion thereof, which corresponds to a numerical aperture of 0.45. Furthermore, the objective lens 48 has a numerical aperture of 0.6, and is optimally designed for an optical disk having a substrate thickness of 0.6 mm. Therefore, the light beam 42 with a wavelength of 650 nm is focused in accordance with the numerical aperture of 0.6.

Next, a light beam 50 reflected by the optical disk 8 passes through the objective lens 48 and the aperture limitation means 47 again, is reflected by the mirror 46, and condensed by the condenser lens 45, and then enters the compound prism 43. In addition, the light beam 50 passes through the compound prism 43 and enters the first module 41. After entering the first module 41, the light beam 50 is diffracted by the hologram 41c, and enters a photo-detector 41b. The photo-detector 41b is configured to detect a focus control signal for making the objective lens 48 follow the recording surface by using the so-called SSD (spot size detection) method and to detect a tracking control signal for making the objective lens 48 follow the track on the track surface by using the phase contrast method.

Furthermore, the second module 51 is provided with a semiconductor laser 51a with a wavelength of 780 nm. Referring to FIG. 12, a light beam 52 with a wavelength of 780 nm emitted from the second module 51 passes through a hologram 51c, and enters the compound prism 43. Since the polarization direction of the light beam 52 is the longitudinal direction of the second module as shown in FIG. 15, the light beam 52 enters the compound prism 43 as s-polarized light. Therefore, the light beam 52 is reflected by the optical film 44 having the characteristics shown in FIGS. 16a, 16b and 16c, and condensed by the condenser lens 45 to become slightly diverging light. After reflected by the mirror 46, the light beam 52 passes through only the internal portion of the aperture limitation means 47, which corresponds to a numerical aperture of 0.45. The light beam then enters the objective lens 48, and is focused on an image formation point p' to form a light spot 53 on the recording surface of the optical disk 13. By limiting the aperture, the numerical aperture is set to 0.45, whereby this configuration can be made compatible with the optical disk 13 having a substrate thickness of 1.2 mm, such as CD.

A light beam 54 reflected by the optical disk 13 passes through the objective lens 48, the aperture limitation means 47 and the mirror 46 again, and is condensed by the condenser lens 45, and then enters the compound prism 43. Most of the light beam 54 is reflected and enters the second module 51. After entering the second module 51, the light beam 54 is diffracted by the hologram 51c, and enters a photo-detector 51b. The photo-detector 51b is configured to detect a focus control signal for making the objective lens 48 follow the recording surface by using the SSD method and to detect a tracking control signal for making the objective lens 48 follow the track on the track surface by using the push-pull method. Although the three-beam method is generally used to detect the tracking control signal for CD, the push-pull method is used in the conventional example in order to simplify explanations.

In the case that the high-density optical disk 8 compatible with a wavelength of 650 nm is played back by using the above-mentioned optical system, the semiconductor laser 41a is lit, its light beam is focused on the optical disk 8, and a light beam reflected by the optical disk 8 is received by the photo-detector 41b, whereby reproduction and control signals can be obtained. In the case that the optical disk 13 compatible with a wavelength of 780 nm is played back, the semiconductor laser 51a is lit, its light beam is focused on the optical disk 13, and a light beam reflected by the optical disk 13 is received by the photo-detector 51b, whereby reproduction and control signals can be obtained. In this way, the two types of optical disks 8 and 13 being different in thickness and wavelength compatibility can be played back.

In the above-mentioned optical heads the light beam 42 is diverging light and has a spread angle in the range of about −7 to +7°. The spread angle in the range of −7 to +7° in the air corresponds to a spread angle in the range of −4.6 to +4.6° in glass. Therefore, the optical film 44 is required to have characteristics of allowing s-polarized light with a wavelength of 650 nm to pass through in the range of 45−4.6° to 45+4.6° and also allowing s-polarized light with a wavelength of 780 nm to be reflected, thereby requiring the characteristics shown in FIGS. 16a, 16b and 16c. These characteristics can be used only for s-polarized light. Even if wavelength characteristics are optimized, the positional relationship in the optical head cannot be arranged so that p-polarized light enters the compound prism 43.

When explained again, in the above-mentioned conventional art, the light beam emitted from the second module 51 for CD playback enters the compound prism 43 as s-polarized light. The polarization direction (direction of electric field) of the light beam is the longitudinal direction of the second module 51 as shown in FIG. 15. Therefore, the module of the optical head is forced to be arranged as shown in FIG. 11 because of the wavelength characteristics of the optical film 44 shown in FIGS. 16a, 16b and 16c.

In other words, the components of the optical head, that is, the module 41, the module 51, the prism 43, the optical film 44, the condenser lens 45, the mirror 46, the aperture limitation means 47 and the objective lens 48, are forced to be arranged on a plane perpendicular to the surface of the optical disk 8. As a result, the compound prism 43 and the second module (for CD) 51 are forced to be arranged in the thickness direction (L) of the optical head, whereby the entire thickness of the optical head is made larger.

Furthermore, in the case that the internal structure of the second module 51 is modified so that its polarization direction is the width direction of the module, the compound prism 43 and the second module 51 can be arranged on a plane parallel to the optical disk 8. However, the minor axis direction of the intensity distribution of the light beam emitted from the semiconductor laser 51a becomes the direction of the track, thereby lowering focusing performance in this direction, and thus being undesirable to reproduction. Moreover, modifying the internal structure of the module causes a problem in production, and producing a new module for CD causes a problem in cost.

An optical film having characteristics shown in FIGS. 5a, 5b and 5c has been developed, which has a transmittance of substantially 0% for both p-polarized light and s-polarized light in a specified wavelength range, and has a transmittance of substantially 100% for both p-polarized light and s-polarized light in another specified wavelength range. By using this optical film, an optical system can be configured regardless of the polarization direction from the light source. However, if this optical film is used for the diverging light in the configuration of the above-mentioned conventional optical head, the polarized light separation width (ΔH in FIG. 5) between p-polarized light and s-polarized light becomes larger than the difference between two wavelengths being used (650 nm and 780 nm in the case of the conventional example), thereby making it difficult to configure an optical system regardless of the polarization direction from the light source.

SUMMARY OF THE INVENTION

In consideration of the problems encountered in the above-mentioned conventional optical head, an object of the present invention is, in an optical system wherein two light sources with different wavelengths are used and a condenser lens and an objective lens are made usable for the two wavelengths, to provide an optical head allowing the optical system to be configured regardless of the polarization direction from the light source, that is, at a high degree of freedom in the positional relationship of components, thereby making it possible to make the optical head thinner and smaller, and to provide an optical disk apparatus comprising the optical head.

A first aspect of the present invention is an optical head comprising a first light source; a second light source; a transmitting and reflecting means having a first surface and a second surface, and used to reflect diverging light from said first light source at said first surface, and to allow diverging light from said second light source to enter said second surface and to go out from said first surface, thereby to synthesize optical paths; an objective lens for converging light from said transmitting and reflecting means on an information recording surface of an optical disk and for condensing light reflected from said disk; and a photo-detector for receiving said reflected light, wherein said first surface and said second surface of said transmitting and reflecting means are not parallel to each other in order to decrease aberration when said diverging light from said second light source passes through said transmitting and reflecting means.

A second aspect of the present invention is an optical head used with optical disks having two different substrate thicknesses, comprising a first light source for emitting light with a first wavelength; a second light source for emitting light with a second wavelength; a transmitting and reflecting means having a first surface and a second surface, and used to reflect diverging light from said first light source at said first surface, and to allow diverging light from said second light source to enter said second surface and to go out from said first surface, thereby to synthesize optical paths; an objective lens for converging said light with said first wavelength on an information recording surface of one optical disk having a smaller substrate thickness, for converging said light with said second wavelength on an information recording surface of the other optical disk having a larger substrate thickness, and for condensing light reflected from said optical disks; a first photo-detector for receiving said reflected light with said first wavelength after reflection by said first surface of said transmitting and reflecting means; and a second photo-detector for receiving said reflected light with said second wavelength after passing through said first and second surfaces of said transmitting and reflecting means, wherein said first surface and said second surface of said transmitting and reflecting means are not parallel to each other in order to decrease aberration when said diverging light from said second light source passes through said transmitting and reflecting means.

A third aspect of the present invention is an optical head used with optical disks having two different substrate thicknesses, comprising a first light source for emitting light with a first wavelength; a second light source for emitting light with a second wavelength; a transmitting and reflecting means having a first surface and a second surface, and used to allow diverging light from said first light source to enter said second surface and to go out from said first surface, and to reflect diverging light from said second light source at said first surface, thereby to synthesize optical paths; an objective lens for converging said light with said first wavelength on an information recording surface of one optical disk having a smaller substrate thickness, for converging said light with said second wavelength on an information recording surface of the other optical disk having a larger substrate thickness and for condensing light reflected from said optical disks; a first photo-detector for receiving said reflected light with said first wavelength after passing through said first and second surfaces of said transmitting and reflecting means; and a second photo-detector for receiving said reflected light with said second wavelength after reflection at said first surface of said transmitting and reflecting means, wherein said first surface and said second surface of said transmitting and reflecting means are not parallel to each other in order to decrease aberration when said diverging light from said first light source passes through said transmitting and reflecting means.

In other words, by forming an optical film for synthesizing and separating diverging light from CD and diverging light from DVD on a prism having an apex angle allowing aberration to decrease when diverging light passes through, the polarized light separation width of the optical film can be made smaller, whereby light beams with two wavelengths can be synthesized and separated regardless whether polarized light is p-polarized light or s-polarized light. Therefore, in accordance with the present invention, in an optical system wherein a condenser lens and an objective lens are made usable for the two wavelengths, the optical system can be configured regardless of the polarization direction from the light source, whereby the optical head can be made thinner.

Consequently, a single optical head can be used for optical disks having different substrate thicknesses or optical disks compatible with different wavelengths. Therefore, recording and reproduction are made possible on DVD optical disks having high density attained by increasing the numerical aperture of the objective lens, on the conventional optical disks having a substrate thickness of 1.2 mm, on disks having high density and being compatible with a short wavelength attained by shortening the wavelength of a semiconductor laser for recording and reproduction, and on disks compatible with the conventional wavelength.

PREFERRED EMBODIMENTS

Embodiments of the present invention will be described below referring to the accompanying drawings.

(First embodiment)

Figure 1:
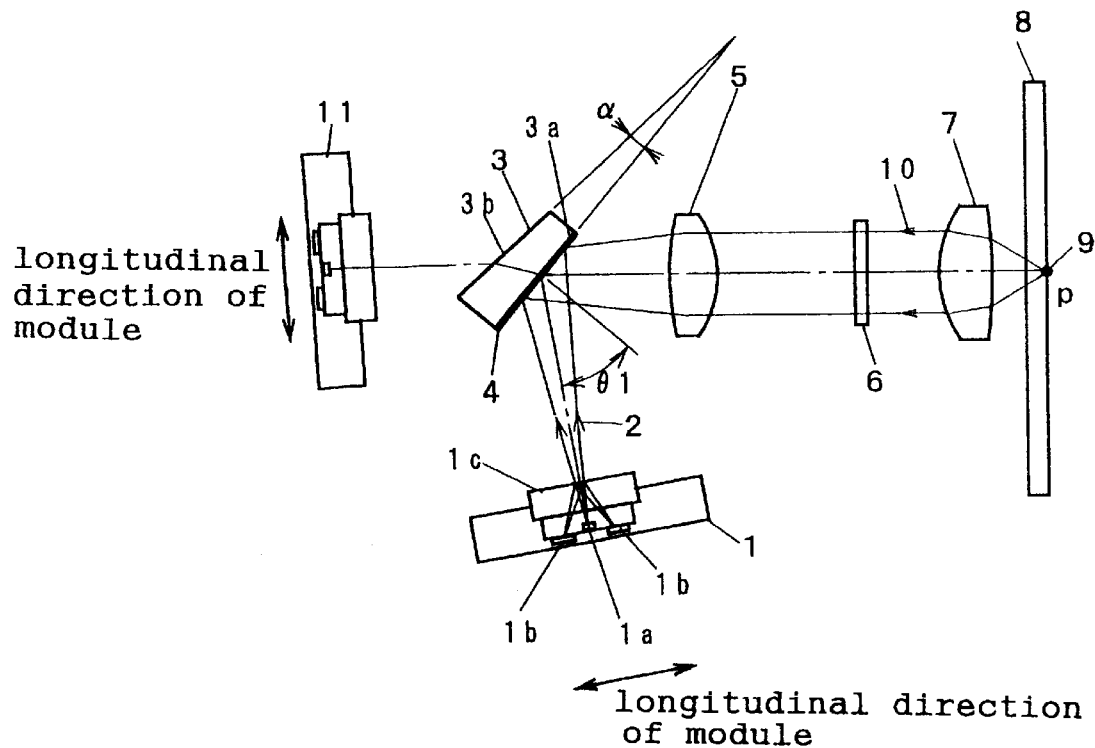
FIG. 1 is a view showing a configuration partially modified from that of an embodiment shown in FIG. 3.
Figure 2:
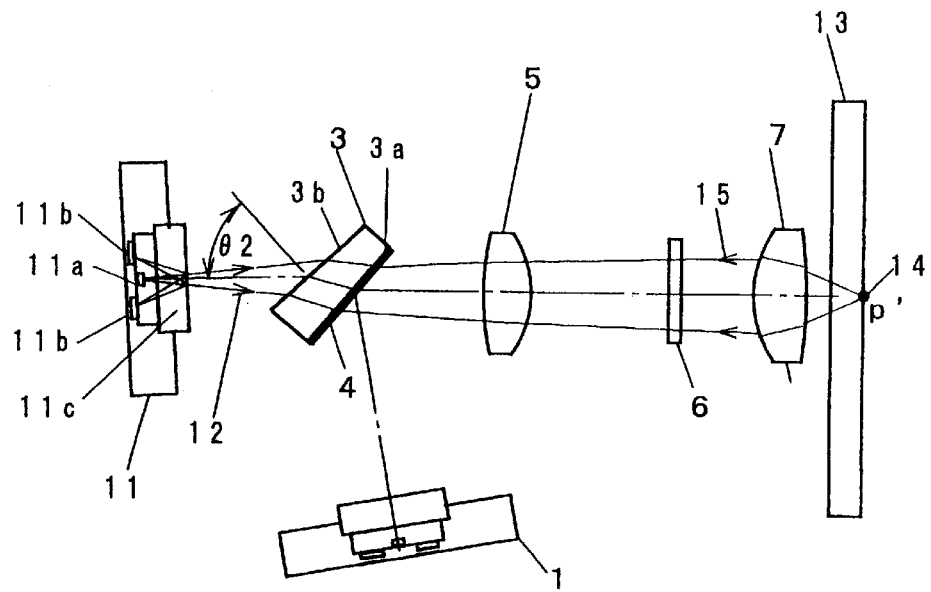
FIG. 2 is a view showing a configuration partially modified from that of an embodiment shown in FIG. 4.
Figure 3:
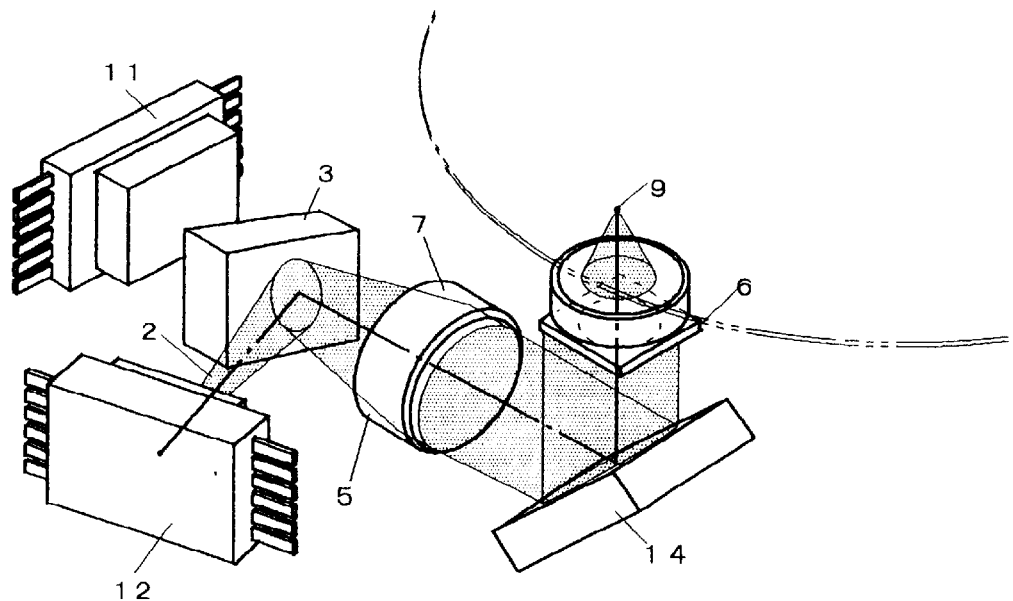
FIG. 3 is a perspective view showing the configuration of an optical head in accordance with a first embodiment of the present invention.
Figure 4:
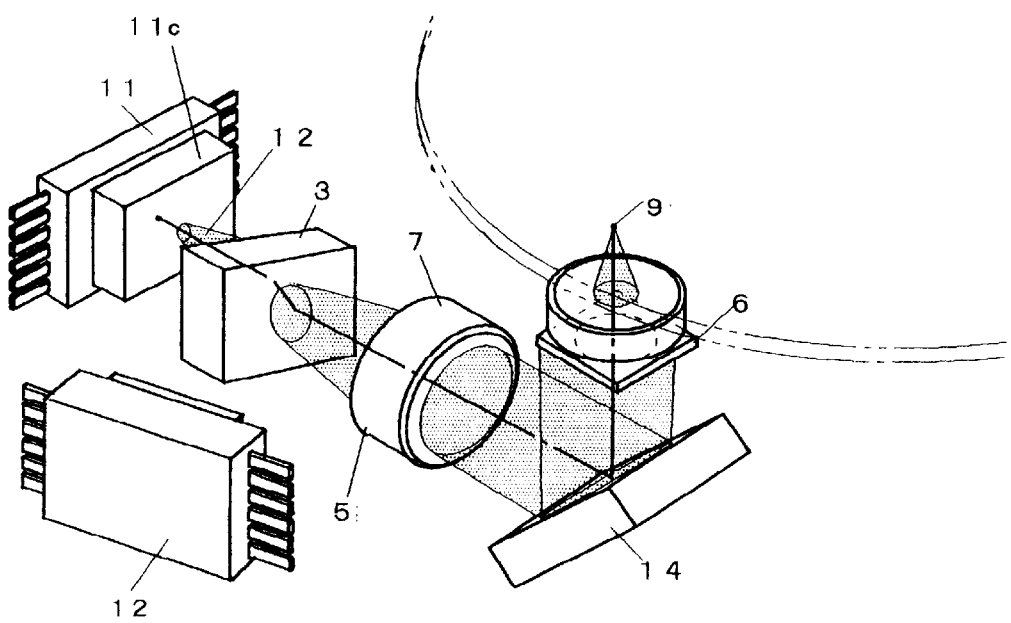
FIG. 4 is a perspective view showing the configuration of the optical head in accordance with the first embodiment of the present invention.

The configuration and operation of an optical head in accordance with a first embodiment of the present invention will be described below referring to the drawings. FIGS. 3 and 4 are perspective views showing the configuration of the optical head in accordance with the first embodiment of the present invention. FIGS. 1 and 2 are schematic views wherein an optical disk 8, an objective lens 7 and an aperture limitation means 6 are temporarily disposed on a plane formed by a first module 1, a second module 2, a prism 3 and a condenser lens 5, with a mirror 14 omitted from FIGS. 3 and 4. FIGS. 1 and 3 show a condition wherein a high-density optical disk 8 having a substrate thickness of 0.6 mm is played back in accordance with the present embodiment, and FIGS. 2 and 4 show a condition wherein an optical disk 13 having a substrate thickness of 1.2 mm is played back. Referring to FIG. 1, the first module 1 for DVD playback is an integrated combination of a semiconductor laser 1a with a wavelength of 650 nm, a hologram 1c for separating light reflected from the optical disk and for providing spatial changes, and a photo-detector 1b for receiving the reflected light. The positions of the photo-detector 1b and the hologram 1c have already been adjusted when the module is assembled. Although the hologram is used as a component for separating the light reflected from the optical disk in the present embodiment, a prism can be used instead of the hologram to obtain the same effect.

Figure 5A:
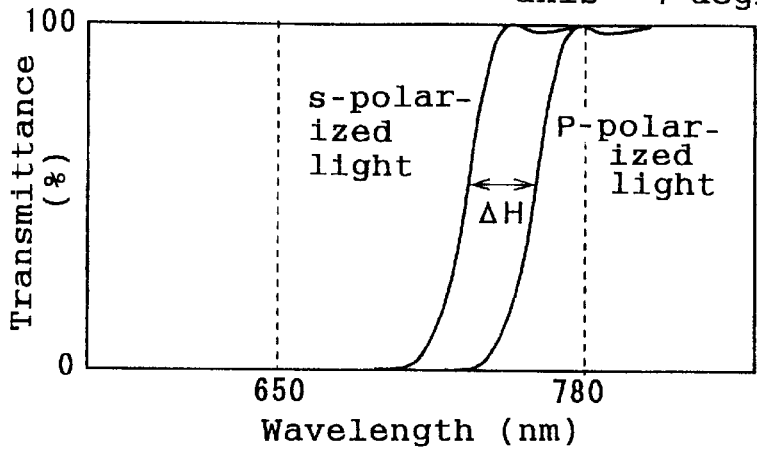
FIGS. 5a, 5b and 5c are graphs showing the characteristics of an optical film in accordance with the first embodiment of the present invention.
Figure 5B:
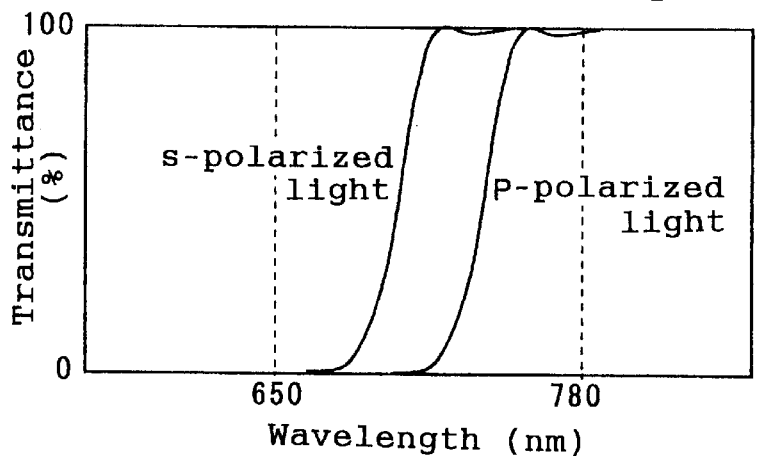
Figure 5C:
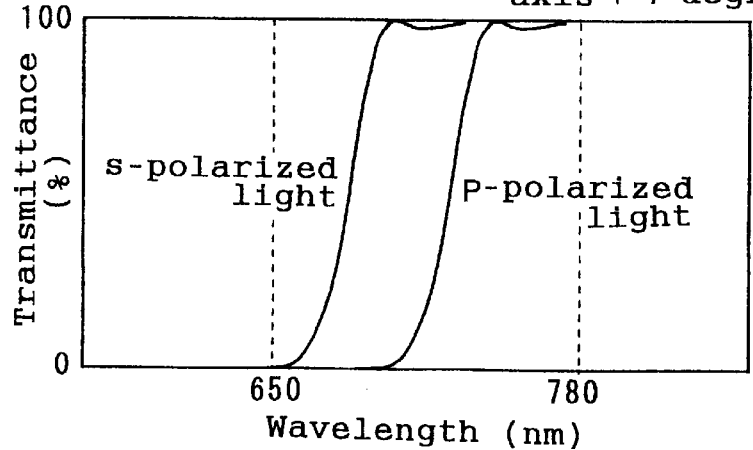
Figure 6:
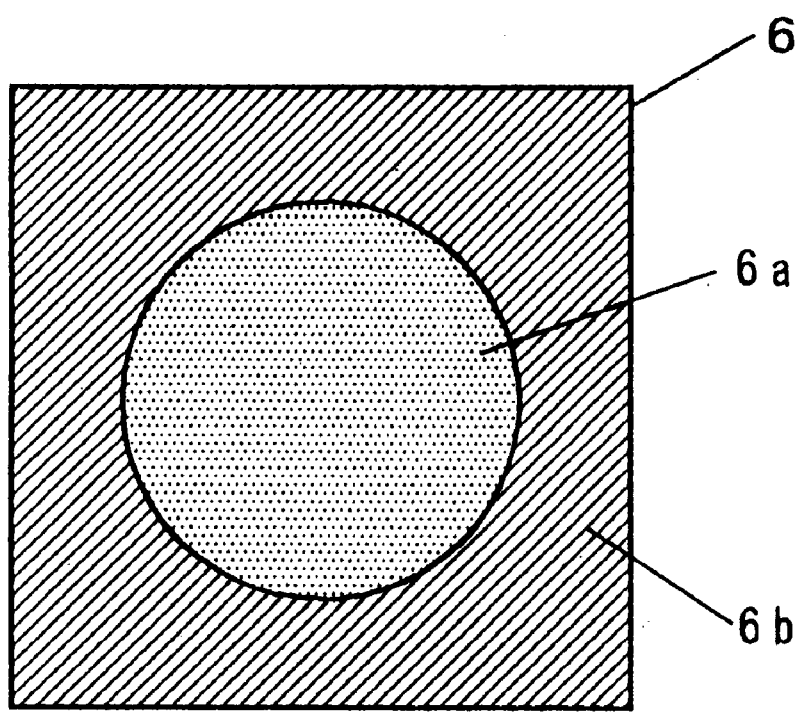
FIG. 6 is an explanatory view showing an aperture limitation means in accordance with the first embodiment of the present invention.

FIGS. 5a, 5b and 5c are graphs showing the characteristics of an optical film in accordance with the first embodiment of the present invention. A light beam 2 with a wavelength of 650 nm emitted from the semiconductor laser 1a of the first module 1 passes through the hologram 1c, and enters the surface 3a of the prism 3 at incident angle θ1. An optical film 4 comprising dielectric multilayers having characteristics shown in FIGS. 5a, 5b and 5c is formed on the surface 3a of the prism 3. When transmittance is 0 in FIGS. 5a, 5b and 5c, it is understood that reflectance is 100%. In other words, both the s-polarized light and p-polarized light of the light beam with a wavelength of 650 nm are reflected in accordance with the characteristics. In addition, since the prism 3, the first module 1, the second module 11 and the like are disposed on the same plane to decrease the thickness of the optical head, the longitudinal direction of each module is made parallel to the same plane (see FIGS. 1 and 3). As a result, the polarization direction coincides with the longitudinal direction, and the light beam 2 enters the prism 3 as p-polarized light. The incoming light beam 2 as p-polarized light is reflected by the optical film 4 having the characteristics shown in FIGS. 5a, 5b and 5c, and condensed by the condenser lens 5 to become a nearly parallel light beam. The direction of the light beam is changed by the reflection mirror 14 to a direction perpendicular to the plane as shown in FIG. 3, and the light beam enters the aperture limitation means 6. As shown in FIG. 6, the aperture limitation means 6 is formed of optical multilayers, wherein the characteristics of the optical multilayer at the internal portion differ from those of the optical multilayer at the external portion.

More specifically, a first optical multilayer 6a is provided at the internal portion and a second optical multilayer 6b is provided at the external portion, and these multilayers are different from each other in layer thickness and the number of layers. The first optical multilayer 6a allows light with a wavelength of 650 nm and light with a wavelength of 780 nm to pass through; and the second optical multilayer 6b allows light with a wavelength of 650 nm to pass through, and allows light with awavelength of 780 nm to be reflected. Therefore, the light beam 2 with a wavelength of 650 nm can pass through both the internal and external portions of the aperture limitation means 6 with almost no loss of the amount of light. In addition, the numerical aperture of the objective lens 7 is set at 0.6 so as to be compatible with high-density optical disks, such as DVD. After entering the objective lens 7, the light beam 2 is focused on an image formation point p in accordance with a numerical aperture of 0.6 to form a light spot 9 on the recording surface of the optical disk 8 having a substrate thickness of 0.6 mm. Next, a light beam 10 reflected by the optical disk 8 passes through the objective lends 7 and the aperture limitation means 6 again, is condensed by the condenser lens 5, and enters the prism 3. The light beam 10 with a wavelength of 650 nm is reflected by the optical film 4 formed on the prism 3, and enters the first module 1. After entering the first module 1, the light beam 10 is diffracted by the hologram 1c and enters the photo-detector 1b. The photo-detector 1b detects a focus control signal for making the objective lens 7 follow the recording surface by using the so-called SSD (spot size detection) method, and detects a tracking control signal for making the objective lens 7 follow the track on the track surface by using the phase contrast method.

The second module 11 for CD playback is an integrated combination of a semiconductor laser 1a with a wavelength of 780 nm, a hologram 11c for separating light reflected from the optical disk and for providing spatial changes, and a photo-detector 11b for receiving the reflected light, being similar to the configuration of the first module 1 for DVD playback.

Referring to FIGS. 2 and 4, a light beam 12 with a wavelength of 780 nm emitted from the second module 11 passes through the hologram 11c, and enters the prism 3 at incident angle θ2. After entering the prism 3, the light beam 12 is refracted at the surfaces 3b, 3a of the prims 3, and goes out so as to have the same optical path as that of the reflected light of the light beam 2. The optical film 4 formed on the prism 3 allows both the p-polarized light and the s-polarized light of the light with a wavelength of 780 nm to pass through as shown in FIGS. 5a, 5b and 5c. The light beam 12 passes through the optical film 4 as the p-polarized light, and is condensed by the condenser lens 7 to become slightly diverging light. By using the aperture limitation means 6, the condensed light beam 12 passes through only the internal portion thereof, which corresponds to a numerical aperture of 0.45, enters the objective lens 7, and is focused on an image formation point p' to form a light spot 14 on the recording surface of the optical disk 13. By limiting the aperture, the optical head is made compatible with the optical disk 13 having a substrate thickness of 1.2 mm, such as CD.

A light beam 15 reflected by the optical disk 13 passes through the objective lens 7 and the aperture limitation means 6 again, is condensed by the condenser lens 5 and enters the prism 3. The light beam 15 with a wavelength of 780 nm passes through the prism 3 and enters the second module 11. After entering the second module 11, the light beam 15 is diffracted by the hologram 11c and enters the photo-detector 11b. The photo-detector 11b is configured to detect a focus control signal for making the objective lens 7 follow the recording surface by using the SSD method and to detect a tracking control signal for making the objective lens 7 follow the track on the track surface by using the push-pull method. Although the push-pull method is used in the present embodiment just as in the case of the conventional example in order to simplify explanations, the three-beam method having been used generally may be used.

In the case of the optical head in accordance with the present embodiment, in an optical system wherein the light beam has a wavelength of 650 nm, the optical disk has a substrate thickness of 0.6 mm, the objective lens 7 is designed to have a numerical aperture of 0.6, and the focal lengths of the object lens 7 and the condenser lens 5 are 3 mm and 25 mm, respectively, by properly setting the distance from the semiconductor laser 11a to the condenser lens 5, a light beam with a wavelength of 780 nm can be converged on the optical disk 13 having a substrate thickness of 1.2 mm at a wavefront aberration of 10 mλ or less. In the present embodiment, the distance from the semiconductor laser 11a to the condenser lens 5 is made shorter than the distance from the semiconductor laser 1a to the condenser lens 5 by about 8 mm. With this configuration, the optical disk 13 having a substrate thickness of 1.2 mm can be played back by using the light beam 12 without problems.

In the case that the high-density optical disk 8 compatible with a wavelength of 650 nm is played back by using the above-mentioned optical head, the semiconductor laser 1a is lit, its light beam is focused on the optical disk 8, and the light beam reflected from the disk is received by the photo-detector 1b to obtain reproduction and control signals. In addition, in the case that the optical disk 13 compatible with a wavelength of 780 nm is played back, the semiconductor laser 11a is lit, its light beam is focused on the optical disk 13, and the light beam reflected from the disk is received by the photo-detector 11b to obtain reproduction and control signals.

In the above-mentioned configuration, since the light beam 2 is cast from the air side to the glass side of the prism 3, the polarized light separation width (ΔH in FIG. 5) between p-polarized light and s-polarized light becomes smaller than that of the conventional prism in which the light beam enters from one glass side to the other glass side thereof. Furthermore, the ΔH can be made smaller even further by decreasing the incident angle θ1 of the light beam 2 with respect to the center of optical axis. When the incident angle θ1 is 39 degrees, and the optical film 4 is designed so as to comprise alternate layers of TiO2 and SiO2, for example, results listed in Table 1 can be obtained. It is assumed that the refractive index of the substrate for the prism 3 is 1.5, and that the optical film thickness is obtained by multiplying the physical film thickness by refractive index.

TABLE 1

Example of configuration of optical film 4
(Design wavelength λ = 680/4 nm)

| Material | Refractive index | Optical film thickness |
| --- | --- | --- |
| Layer 1 | TiO$_2$ | 2.25 | 0.60λ |
| Layer 2 | SiO$_2$ | 1.46 | 1.00λ |
| Layer 3 | TiO$_2$ | 2.25 | 0.90λ |
| Layer 4 | SiO$_2$ | 1.46 | 1.00λ |
| Layer 5 | TiO$_2$ | 2.25 | 1.00λ |

TABLE 1-continued

Example of configuration of optical film 4
(Design wavelength λ = 680/4 nm)

| Material | Refractive index | Optical film thickness |
| --- | --- | --- |
| Layer 6 | SiO$_2$ | 1.46 | 1.00λ |
| Layer 7 | TiO$_2$ | 2.25 | 1.00λ |
| Layer 8 | SiO$_2$ | 1.46 | 1.00λ |
| Layer 9 | TiO$_2$ | 2.25 | 1.00λ |
| Layer 10 | SiO$_2$ | 1.46 | 1.00λ |
| Layer 11 | TiO$_2$ | 2.25 | 1.00λ |
| Layer 12 | SiO$_2$ | 1.46 | 1.00λ |
| Layer 13 | TiO$_2$ | 2.25 | 1.00λ |
| Layer 14 | SiO$_2$ | 1.46 | 1.00λ |
| Layer 15 | TiO$_2$ | 2.25 | 1.00λ |
| Layer 16 | SiO$_2$ | 1.46 | 1.00λ |
| Layer 17 | TiO$_2$ | 2.25 | 1.00λ |
| Layer 18 | SiO$_2$ | 1.46 | 1.00λ |
| Layer 19 | TiO$_2$ | 2.25 | 0.90λ |
| Layer 20 | SiO$_2$ | 1.46 | 1.00λ |
| Layer 21 | TiO$_2$ | 2.25 | 0.60λ |

Figure 7A:
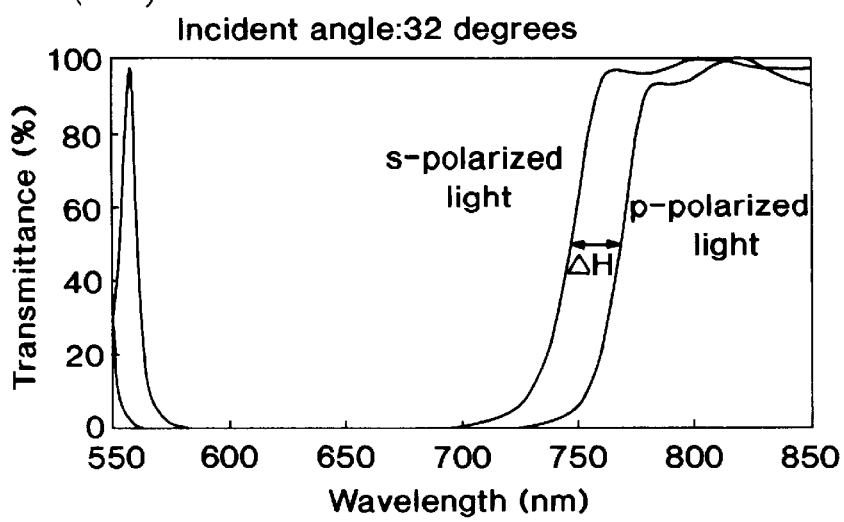
FIGS. 7a, 7b and 7c are graphs showing the characteristics of a design example of the optical film in accordance with the first embodiment of the present invention.
Figure 7B:
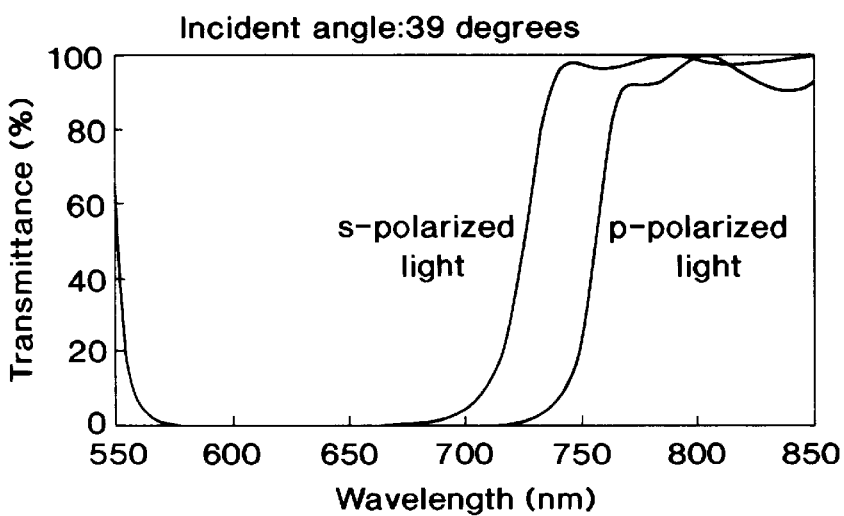
Figure 7C:
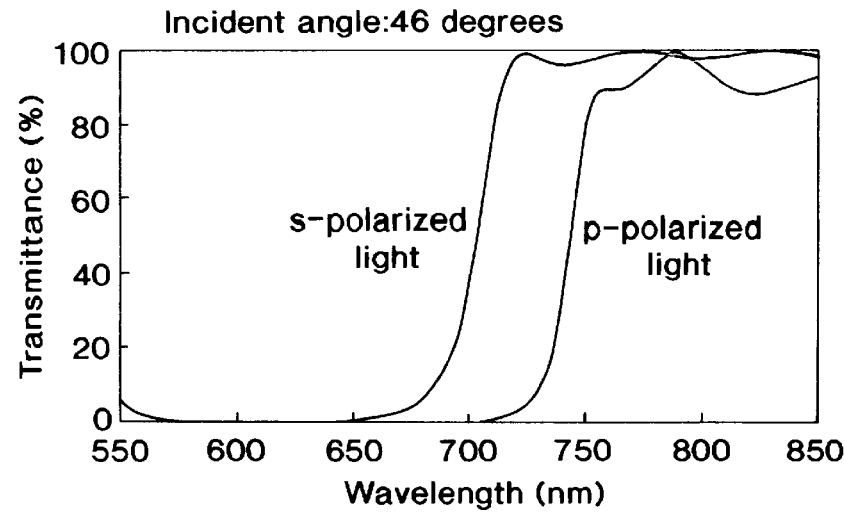
Figure 16A:
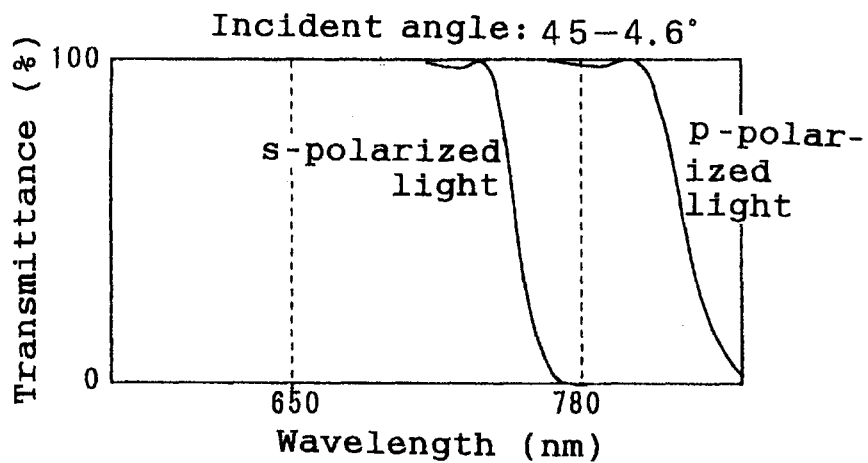
FIGS. 16a, 16b and 16c are graphs showing the characteristics of the optical film of the conventional optical head.
Figure 16B:
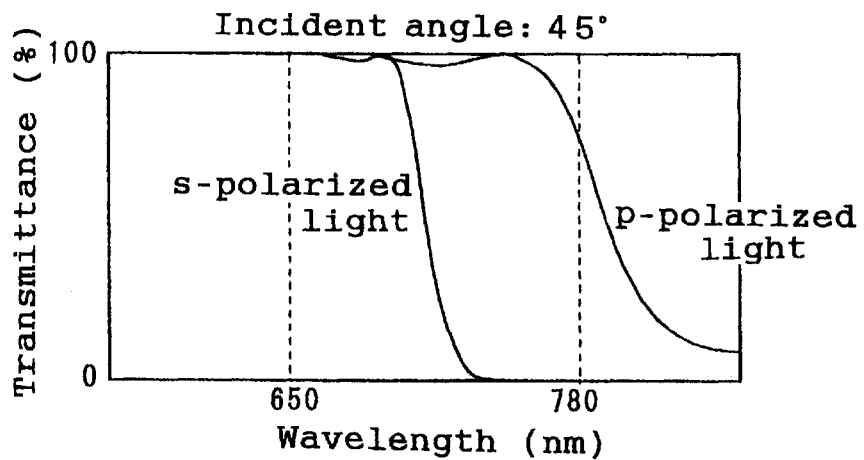
Figure 16C:
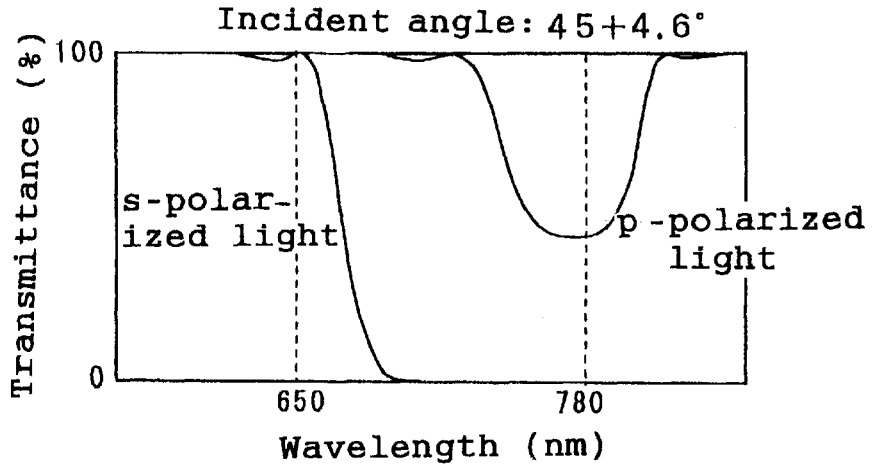

The characteristics of the above-mentioned optical film are obtained by calculation and indicated in FIGS. 7a, 7b and 7c. A range of −7 to +7° is used as the spread angle of the light beam 2. Therefore, an angle of 39 ±7° was used as the incident angle in the calculation. FIG. 7a shows the transmittance of the optical film 4 at an incident angle of 32 degrees; FIG. 7b shows the transmittance of the optical film 4 at an incident angle of 39 degrees; and FIG. 7c shows the transmittance of the optical film 4 at an incident angle of 46 degrees. The polarized light separation width ΔH between p-polarized light and s-polarized light is about 25 nm in accordance with the graphs. The width can thus be made smaller to ¼ to ⅓ or less of the width obtained in the case of the compound prism comprising 45-degree prisms described in reference with FIG. 16, and the p-polarized light can be reflected completely. For this reason, the optical film can be configured so that both the p-polarized light and the s-polarized light of the light beam with a wavelength of 650 nm and having a spread angle in the range of −7 to +7° can be reflected completely, and so that both the p-polarized light and the s-polarized light of the light beam with a wavelength of 780 nm and having a spread angle in the range of −7 to +7° can pass through completely. Furthermore, the optical film can be configured so that the light beam can enter the prism 3 as p-polarized light as shown in FIG. 1.

By casting diverging light from the air side to the glass side, it is possible to obtain an optical film which allows both the p-polarized light and the s-polarized light of a light beam with a wavelength of 780 nm to pass through, and allows both the p-polarized light and the s-polarized light of a light beam with a wavelength of 650 nm to be reflected. However, if the light beam 12, that is, diverging light, passes through a glass pane having parallel surfaces, astigmatism is caused, and sufficient convergence performance cannot be obtained. If the light beam 12 enters a glass pane having parallel surfaces and a thickness of 1.5 mm at an incident angle of 45 degrees, and when the light beam is converged on an optical disk, an astigmatism of 300 mλrms or more is caused. Therefore, the glass pane cannot be used for the optical head. In the present invention, an angle (apex angle α) is provided between the surface 3a and the surface 3b of the prism 3 to solve this problem. In other words, by inclining the surface 3b with respect to the surface 3a of the prism 3, astigmatism by the optical beam 12 passing through the prism 3 can be corrected.

For example, when it is assumed that:

Apex angle of prism 3 α=2.05°
Thickness of central portion of prism 3 T=1.5 mm
Incident angle of light beam θ1=39°
Incident angle of light beam 12 θ2=42.85°
Numerical aperture of objective lens 7 NA=0.45
and when the light beam 12, having passed through the prism 3, is converged by the objective lens 7, the astigmatism can be improved to 15 mλrms. The astigmatism can be decreased further depending on design. However, in the case of general optical heads, the astigmatism of this level is similar to those generated by optical components, and causes no problem. Furthermore, in the present embodiment, the light beam passing through the prism 3 is used for CD, and the light beam reflected by the prism 3 is used for DVD. However, provided that the astigmatism is at this level, no problem is caused even when the light beam passing through the prism 3 is used for DVD, and the light beam reflected by the prism 3 is used for C.

As described above, in accordance with the present invention, an optical film for synthesizing and separating the diverging light for CD and the diverging light for DVD is formed on a prism having an apex angle allowing aberration to decrease when diverging light passes through, whereby optical paths for two wavelengths can be synthesized and separated, regardless of p-polarized or s-polarized light. Therefore, in an optical systemwherein a condenser lens and an objective lens are used for two wavelengths, the optical system can be configured regardless of the polarization direction from the light source, and the prism 3, the first module 1 and the second module 11 can be disposed on the same plane. Furthermore, the longitudinal direction of each module can coincide with a direction along the plane. As a result, the optical head can be made smaller and thinner.

In addition to making the optical head smaller and thinner, it is possible to make an optical disk apparatus incorporating the optical head smaller and thinner.

(Second embodiment)

Figure 8:
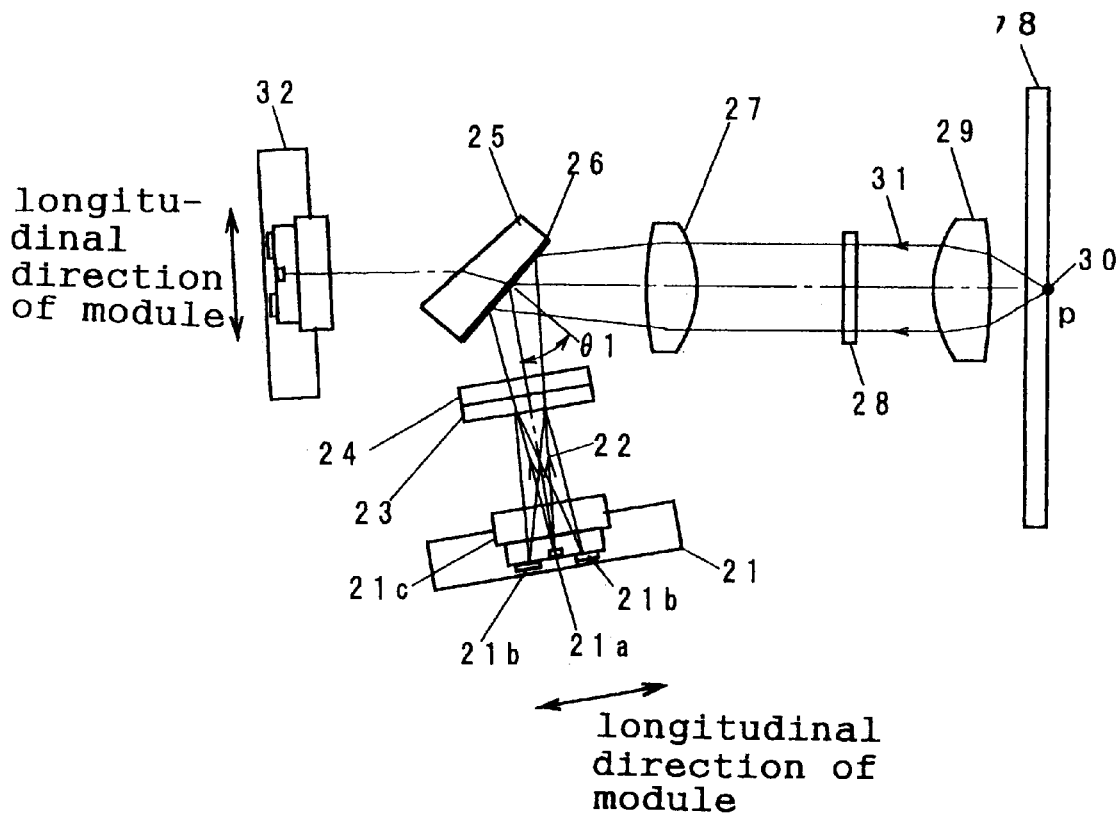
FIG. 8 is a view showing the configuration of an optical head in accordance with a second embodiment of the present invention.
Figure 9:
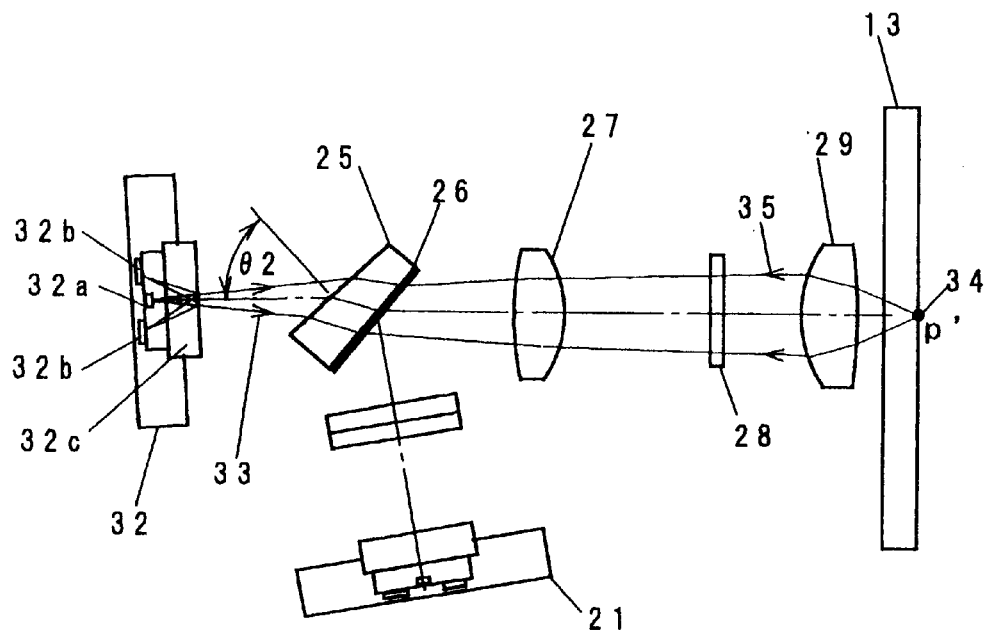
FIG. 9 is a view showing the configuration of the optical head in accordance with the second embodiment of the present invention.
Figure 10:
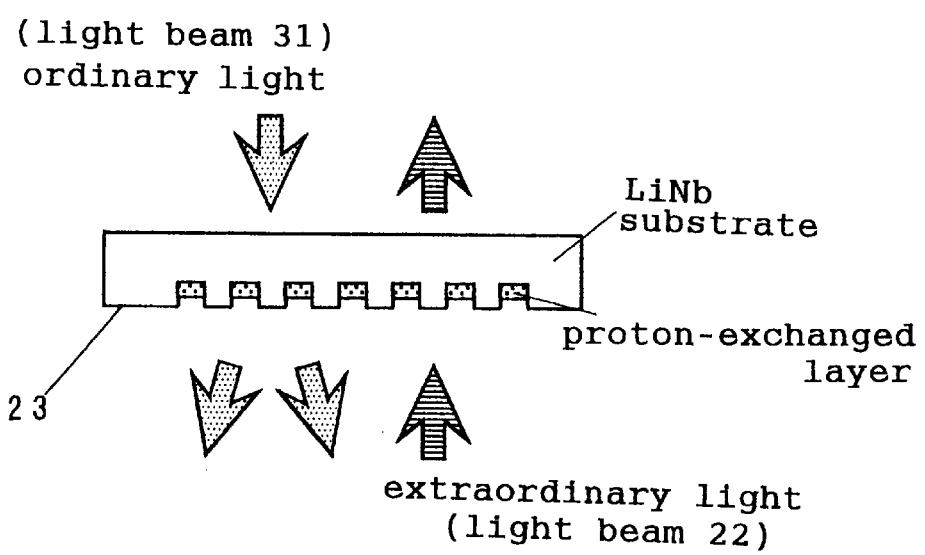
FIG. 10 is an explanatory view showing a polarization hologram in accordance with the second embodiment of the present invention.
Figure 11:
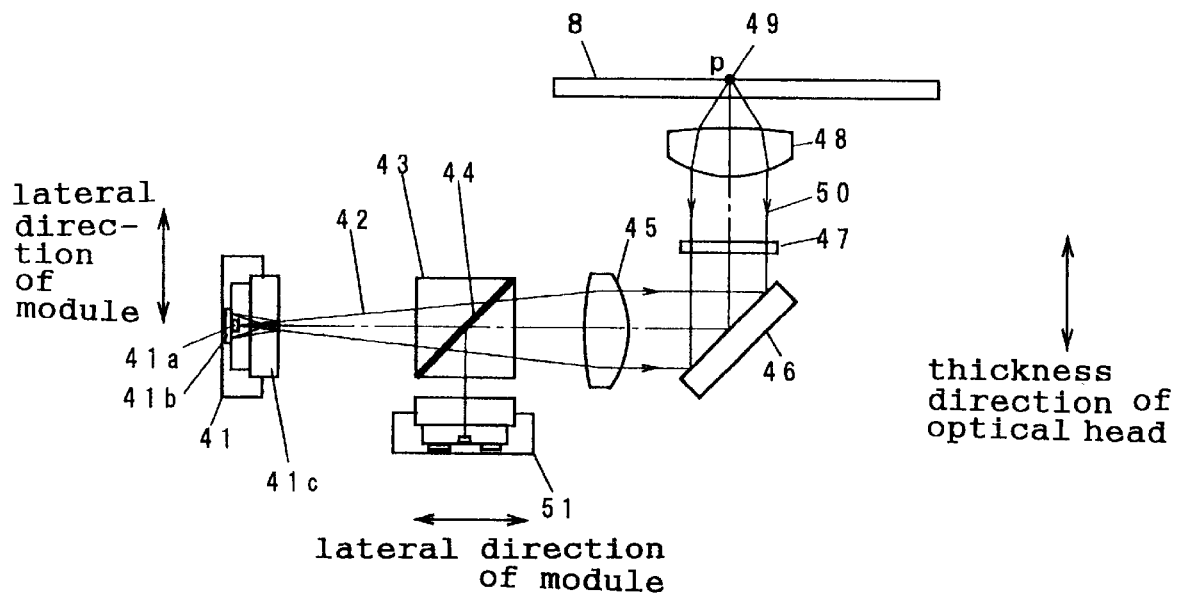
FIG. 11 is a view showing the configuration of a conventional optical head.
Figure 12:
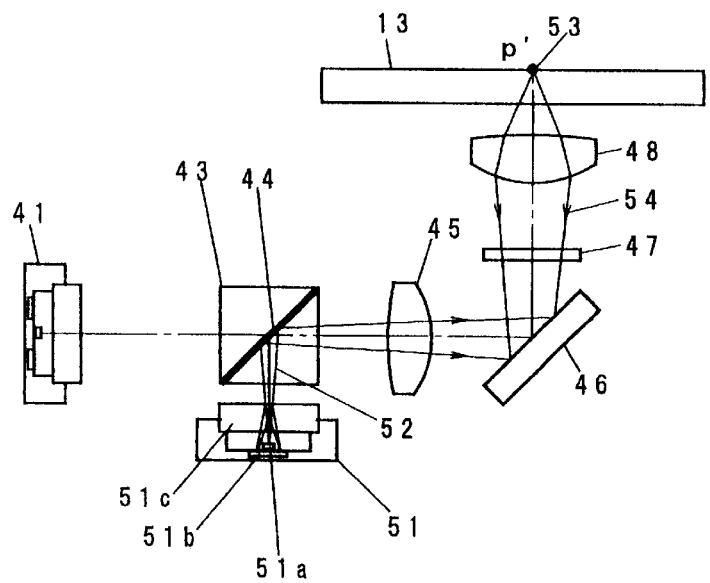
FIG. 12 is a view showing the configuration of the conventional optical head.
Figure 13:
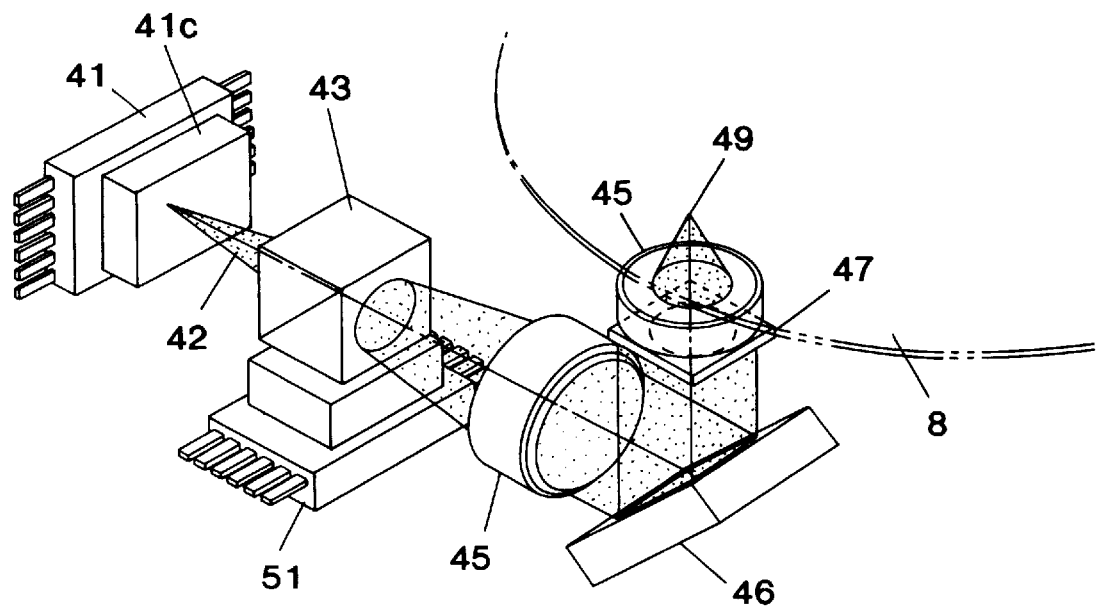
FIG. 13 is a perspective view showing the conventional optical head shown in FIG. 11.
Figure 14:
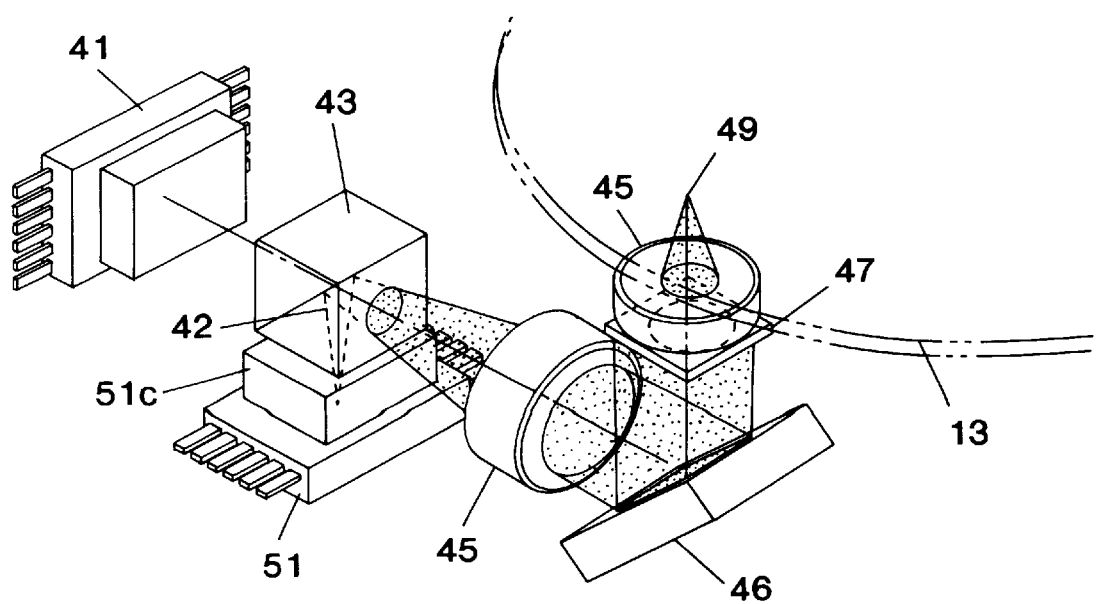
FIG. 14 is a perspective view showing the conventional optical head shown in FIG. 12.
Figure 15:
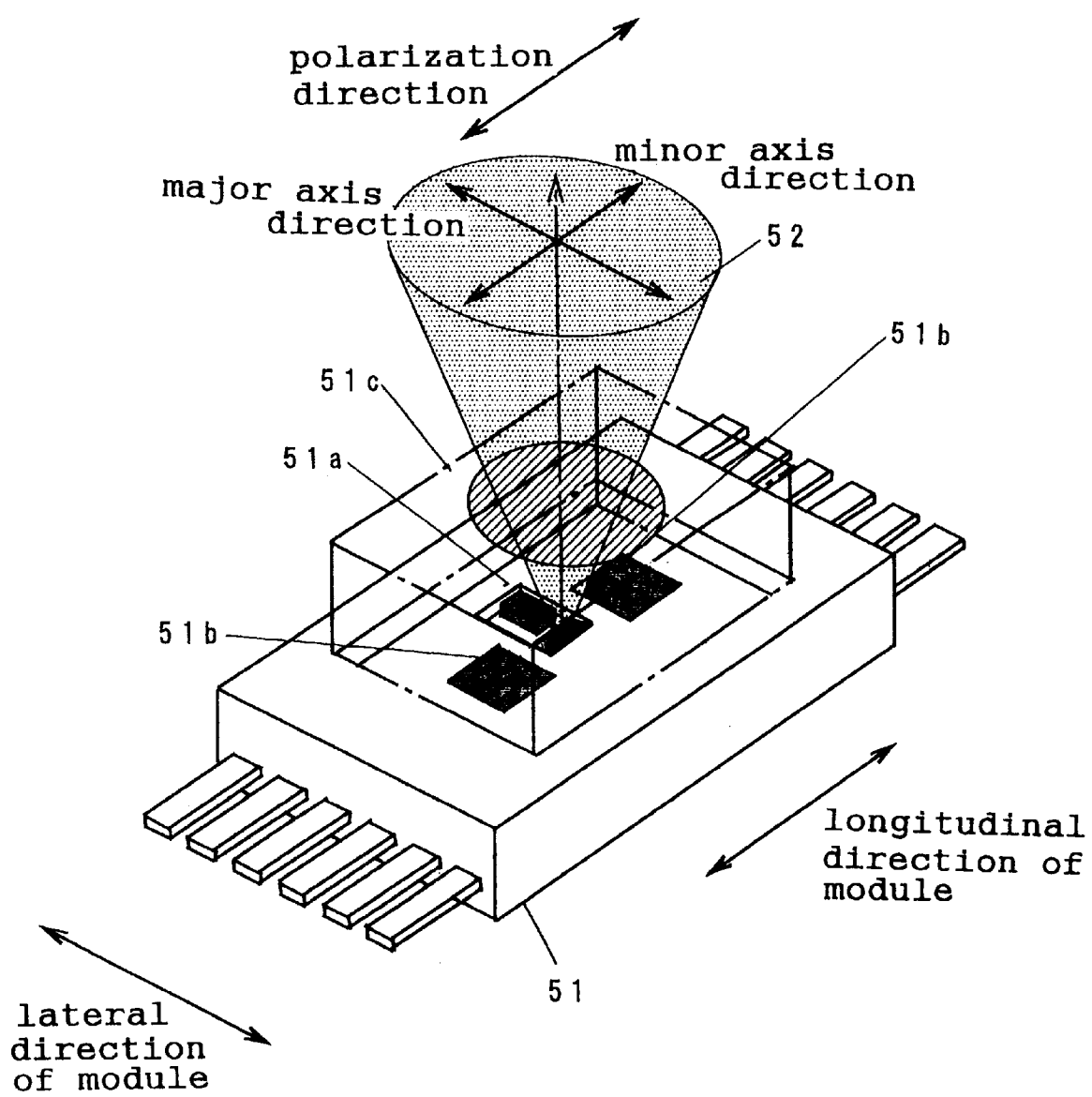
FIG. 15 is an explanatory view showing the module of the conventional optical head.

The configuration and operation of an optical head in accordance with a second embodiment of the present invention will be described below referring to the drawings. FIGS. 8 and 9 are views showing the configuration of the optical head in accordance with the second embodiment of the present invention. FIG. 8 shows a condition wherein a high-density optical disk 8 having a substrate thickness of 0.6 mm is played back in accordance with the present embodiment, and FIG. 9 shows a condition wherein an optical disk 13 having a substrate thickness of 1.2 mm is played back. Referring to FIG. 8, a first module 21 for DVD playback is an integrated combination of a semiconductor laser 21a with a wavelength of 650 nm and a photo-detector 21b for receiving light reflected from the disk. In both FIGS. 8 and 9, all components are disposed on a plane perpendicular to the optical disks 8 and 13 in order to simply explanation.

A light beam 22 with a wavelength of 650 nm emitted from the semiconductor laser 21a of the first module 21 passes through a polarization hologram 23 and a quarter-wave plate 24 and becomes circularly polarized light. Diverging light having become the circularly polarized light enters a prism 25 at incident angle θ1 at the center of the optical axis. Since the prism 25, the first module 21 and a second module 32 are disposed on the same plane, the longitudinal directions of the modules are the directions shown in FIGS. 8 and 9. As a result, p-polarized light enters the polarization hologram 23. An optical film 26 comprising dielectric multilayers is formed on the prism 25 as shown in FIG. 3. The prism 25 and the optical film 26 may be the same as those used in the above-mentioned first embodiment. The light beam 22 having become the circularly polarized light is reflected by the optical film 26 and condensed by a condenser lens 27 and becomes a nearly parallel light beam, and enters an aperture limitation means 28. The aperture limitation means 28 is formed of optical multilayers, wherein the characteristics of the optical multilayer at the internal portion differ from those of the optical multilayer at the external portion. The internal portion allows light with a wavelength of 650 nm and light with a wavelength of 780 nm to pass through; and the external portion allows light with a wavelength of 650 nm to pass through, and allows light with a wavelength of 780 nm to be reflected. Therefore, the light beam 22 with a wavelength of 650 nm can pass through both the internal and external portions of the aperture limitation means 28. The numerical aperture of the objective lens 29 is set at 0.6 so as to be compatible with high-density optical disks, such as DVD. After entering the objective lens 29, the light beam 22 is focused on an image formation point p to form a light spot 30 on the recording surface of the optical disk 8 having a substrate thickness of 0.6 mm. Next, a light beam 31 reflected by the optical disk 8 passes through the objective lends 29 and the aperture limitation means 28 again, is condensed by the condenser lens 27, and enters the prism 25. The light beam 31 with a wavelength of 650 nm is reflected by the optical film 26 formed on the prism 25, and is converted into linearly polarized light perpendicular to the light beam 22 by the quarter-wave plate 24, and enters the polarization hologram 23. The polarization hologram 23 is made by forming a hologram on a LiNb substrate formed of complex refraction materials by proton exchange, and is configured to allow extraordinary light to pass through and to allow ordinary light to be diffracted. By using the light beam 22 as extraordinary light, and by using the light beam 31 as ordinary light, the light beam 22 is allowed to pass through, and the light beam 31 is allowed to be diffracted. The diffracted light beam 31 passes through the cover glass 21c of the first module 21 and enters the photo-detector 21b. The photo-detector 21b detects a focus control signal for making the objective lens 29 follow the recording surface by using the SSD method, and detects a tracking control signal for making the objective lens 29 follow the track on the track surface by using the phase contrast method.

Referring to FIG. 9, a light beam 33 with a wavelength of 780 nm emitted from the second module 32 passes through the hologram 32c, and enters the prism 25 at incident angle θ2. Since the direction of polarization is the longitudinal direction of the module, the light beam 33 enters the prism 25 as p-polarized light, is refracted at the surface of the prism and goes out so as to have the same optical path as that of the light beam 22. The optical film 26 formed on the prism 25 allows both the p-polarized light and the s-polarized light of the light beam with a wavelength of 780 nm to pass through because of the characteristics shown in FIGS. 5a, 5b and 5c. Therefore, the light beam 33, that is, p-polarized light, passes through the optical film 26, and is condensed by the condenser lens 27 so as to become slightly diverging light. By using the aperture limitation means 28, the condensed light beam 33 passes through only the internal portion of the aperture limitation means 28, corresponding to a numerical aperture of 0.45, enters the objective lens 29, and is focused on an image formation point p' to form a light spot 34 on the recording surface of the optical disk 13. By the aperture limitation, the optical head is made compatible with the optical disk 13 having a substrate thickness of 1.2 mm, such as CD.

A light beam 35 reflected by the optical disk 13 passes through the objective lends 29 and the aperture limitation means 28 again, is condensed by the condenser lens 27 and enters the prism 25. The light beam 35 with a wavelength of 780 nm passes through the prism 25 and enters the second module 32. After entering the second module 32, the light beam 35 is diffracted by the hologram 32c and enters the photo-detector 32b. The photo-detector 32b is configured to detect a focus control signal for making the objective lens 29 follow the recording surface by using the SSD method and to detect a tracking control signal for making the objective lens 29 follow the track on the track surface by using the push-pull method.

In the case that the high-density optical disk 8 compatible with a wavelength of 650 nm is played back by using the above-mentioned optical head, the semiconductor laser 21a is lit, its light beam is focused on the optical disk 8, and a reflected light beam from the disk is received by the photo-detector 21b, whereby reproduction and control signals can be obtained. In addition, in the case that the optical disk 13 compatible with a wavelength of 780 nm is played back, the semiconductor laser 32a is lit, its light beam is focused on the optical disk 13, and a reflected light beam from the disk is received by the photo-detector 32b, whereby reproduction and control signals can be obtained.

The characteristics of the above-mentioned optical film 26 are similar to those of the first embodiment. The characteristics of a film designed actually are shown in FIGS. 7a, 7b and 7c. The optical film can thus be configured so that both the p-polarized light and the s-polarized light of the light beam with a wavelength of 650 nm and having a spread angle in the range of −7 to +7° can be reflected totally, and BO that both the p-polarized light and the s-polarized light of the light beam with a wavelength of 780 nm and having a spread angle in the range of −7 to +7° can pass through totally. Therefore, by using the polarization hologram, light utilization efficiency for DVD playback can be raised, and the optical head can be made compatible with phase change disks having low reflectance. When the polarization hologram is used, the light beam 22 with a wavelength of 650 nm is converted into circularly polarized light by the quarter-wave plate and enters the prism 25. Therefore, the optical film 26 is required to allow the s-polarized light and the p-polarized light of the light beam with a wavelength of 650 nm to be reflected, and to allow the p-polarized light of the light beam with a wavelength of 780 nm to pass through. The characteristics shown in FIGS. 7a, 7b and 7c satisfy these requirements. Consequently, the method of the present invention can be compatible with an optical head comprising a polarization hologram.

As described above, in accordance with the present invention, an optical film for synthesizing and separating the diverging light for CD and the diverging light for DVD is formed on a prism having an apex angle allowing aberration to decrease when diverging light passes through, whereby optical paths for two wavelengths can be synthesized and separated, regardless of p-polarized or s-polarized light. Therefore, in an optical system wherein a condenser lens and an objective lens are used for two wavelengths, the optical system can be configured regardless of the polarization direction from the light source, and the prism 25, the first module 21 and the second module 32 can be disposed on the same plane. As a result, the optical head can be made smaller and thinner.

Although reproduction of recorded data has been mentioned in the descriptions of the above-mentioned embodiments, the art of the present invention can also be used to record data. Furthermore, although modules have been used to play back DVD and CD, discrete components, such as semiconductor lasers, photoreceptors and holograms, can also be used in a similar manner to form the above-mentioned configuration.

In the present embodiment, the modules, the hologram and the prism can be disposed on a plane being parallel to the optical disk, and the longitudinal direction of each module can coincide with a direction along the plane. Therefore, in addition to making the optical head smaller and thinner, it is possible to make an optical disk apparatus incorporating the optical head smaller and thinner.

Being evident from the above descriptions, in an optical system wherein two light sources with different wavelengths are used and a condenser lens and an objective lens are used for the two wavelengths, the present invention is able to configure the optical system regardless of the directions of polarization from the light sources, whereby the present invention is able to provide an optical head capable of being made smaller and thinner, and to provide an optical disk apparatus comprising the optical head.

In other words, in accordance with the present invention, in an optical system wherein a module for DVD and a module for CD, compatible with wavelengths different from each other, are used, and an objective lens and a condenser lens are used for the two wavelengths, an optical film for synthesizing and separating diverging light for CD and diverging light for DVD is formed on a prism having an apex angle allowing aberration to decrease when diverging light passes through, whereby light beams with two different wavelengths can be synthesized and separated regardless of p-polarized or s-polarized light. Consequently, the optical system can be configured regardless of the direction of polarization from the light source, and the prism and the modules can be disposed on the same plane, without being overlaid in the direction of thickness, whereby the optical head can be made smaller and thinner.

What is claimed is:

1. An optical head comprising a first light source; a second light source; a transmitting and reflecting means having a first surface and a second surface, and used to reflect diverging light from said first light source at said first surface, and to allow diverging light from said second light source to enter said second surface and to go out from said first surface, thereby to synthesize optical paths; an objective lens for converging light from said transmitting and reflecting means on an information recording surface of an optical disk and for condensing light reflected from said disk; and a photo-detector for receiving said reflected light, wherein that said first surface and said second surface of said transmitting and reflecting means are not parallel to each other in order to decrease aberration when said diverging light from said second light source passes through said transmitting and reflecting means.

2. An optical head in accordance with claim 1, wherein said transmitting and reflecting means comprises a transparent member and an optical film disposed on one surface of said transparent member; the transmittance of said optical film is substantially 0% for the s-polarized light and p-polarized light of incident light having a wavelength within a specified range, and is substantially 100% for the s-polarized light and p-polarized light of incident light having a wavelength within another specified range; and said optical film is disposed on said first surface.

3. An optical head in accordance with claim 1, wherein the angle between said first surface and said second surface is set at 2±1°.

4. An optical disk apparatus comprising at least one head in accordance with claim 1, a drive unit for driving said optical head, and a signal processing circuit for processing signals from said optical head.

5. An optical head used with optical disks having two different substrate thicknesses, comprising a first light source for emitting light with a first wavelength; a second light source for emitting light with a second wavelength; a transmitting and reflecting means having a first surface and a second surface, and used to reflect diverging light from said first light source at said first surface, and to allow diverging light from said second light source to enter said second surface and to go out from said first surface, thereby to synthesize optical paths; an objective lens for converging said light with said first wavelength on an information recording surface of one optical disk having a smaller substrate thickness, for converging said light with said second wavelength on an information recording surface of the other optical disk having a larger substrate thickness, and for condensing light reflected from said optical disks; a first photo-detector for receiving said reflected light with said first wavelength after reflection by said first surface of said transmitting and reflecting means; and a second photo-detector for receiving said reflected light with said second wavelength after passing through said first and second surfaces of said transmitting and reflecting means, wherein said first surface and said second surface of said transmitting and reflecting means are not parallel to each other in order to decrease aberration when said diverging light from said second light source passes through said transmitting and reflecting means.

6. An optical head in accordance with claim 5, further comprising an aperture limitation means for limiting an aperture for said light with said second wavelength.

7. An optical head in accordance with claim 6, wherein said aperture limitation means limits said aperture for said light with said second wavelength so that the numerical aperture thereof is set at 0.45.

8. An optical head in accordance with claim 5, wherein said objective lens is configured to decrease aberration when said light with said first wavelength is converged on the information recording surface of said optical disk having said smaller substrate thickness, and said second light source is disposed at a position where aberration decreases when said light with said second wavelength is converged on the information recording surface of said optical disk having said larger substrate thickness.

9. An optical head in accordance with one of claims 5, wherein said optical disk having said smaller substrate thickness has a thickness of substantially 0.6 mm, and said optical disk having said larger substrate thickness has a thickness of substantially 1.2 mm.

10. An optical head in accordance with claim 5, wherein said first wavelength has a value between 620 nm and 670 nm, and said second wavelength has a value between 760 nm and 850 nm.

11. An optical head in accordance with claim 5, wherein said first light source, said second light source, said transmitting and reflecting means, said first photo-detector and said second photo-detector are disposed on the same plane that is in parallel with and different from a plane on which said optical disks are disposed.

12. An optical head in accordance with claim 11, wherein the longitudinal directions of said first and second light sources are directions along said plane on which said first light source, said second light source, said transmitting and reflecting means, said first photo-detector and said second photo-detector are disposed.

13. An optical head used with optical disks having two different substrate thicknesses, comprising a first light source for emitting light with a first wavelength; a second light source for emitting light with a second wavelength; a transmitting and reflecting means having a first surface and a second surface, and used to allow diverging light from said first light source to enter said second surface and to go out from said first surface, and to reflect diverging light from said second light source at said first surface, thereby to synthesize optical paths; an objective lens for converging said light with said first wavelength on an information recording surface of one optical disk having a smaller substrate thickness, for converging said light with said second wavelength on an information recording surface of the other optical disk having a larger substrate thickness and for condensing light reflected from said optical disks; a first photo-detector for receiving said reflected light with said first wavelength after passing through said first and second surfaces of said transmitting and reflecting means; and a second photo-detector for receiving said reflected light with said second wavelength after reflection at said first surface of said transmitting and reflecting means, wherein said first surface and said second surface of said transmitting and reflecting means are not parallel to each other in order to decrease aberration when said diverging light from said first light source passes through said transmitting and reflecting means.

14. An optical head in accordance with claim 13, further comprising an aperture limitation means for limiting an aperture for said light with said second wavelength.

15. An optical head in accordance with claim 14, wherein said aperture limitation means limits said aperture for said light with said second wavelength so that the numerical aperture thereof is set at 0.45.

16. An optical head comprising:

a first light source;

a second light source;

transmitting and reflecting means having a first surface for reflecting diverging light emitted from the first light source and a second surface, disposed at a predetermined non-zero angle with respect to the first surface, for transmitting diverging light emitted from the second light source to the first surface and through the first surface, wherein aberration is decreased when diverging light from the second light source passes through said transmitting and reflecting means;

an objective lens for focusing light emitted from said transmitting and reflecting means on an information recording surface and for condensing light reflected by the information recording surface; and a photo-detector for receiving light reflected by the information recording surface.

17. An optical head comprising:

a first light source for emitting light with a first wavelength;

a second light source for emitting light with a second wavelength;

transmitting and reflecting means having a first surface for reflecting diverging light emitted from the first light source and a second surface, disposed at a predetermined non-zero angle with respect to the first surface, for transmitting diverging light emitted from the second light source to the first surface and through the first surface, wherein aberration is decreased when diverging light from the second light source passes through said transmitting and reflecting means;

an objective lens for focusing light emitted from said transmitting and reflecting means with the first wavelength on a first information recording surface, for focusing light emitted from said transmitting and reflecting means with the second wavelength on a second information recording surface, and for condensing light reflected by one of the first information recording surface and the second information recording surface;

a first photo-detector for receiving light with the first wavelength reflected by the first surface of said transmitting and reflecting means; and a second photo-detector for receiving light with the second wavelength passing through the first surface and the second surface of said transmitting and reflecting means.

18. An optical head recording information to and reproducing information from a first optical disk, having a first substrate thickness, and a second optical disk, having a second substrate thickness, the first substrate thickness smaller than the second substrate thickness, said optical head comprising:

a first light source for emitting light with a first wavelength;

a second light source for emitting light with a second wavelength;

transmitting and reflecting means having a first surface for reflecting diverging light emitted from the second light source and a second surface, disposed at a predetermined non-zero angle with respect to the first surface, for transmitting diverging light emitted from the first light source to the first surface and through the first surface, wherein aberration is decreased when diverging light from the first light source passes through said transmitting and reflecting means;

an objective lens for focusing light emitted from said transmitting and reflecting means with the first wavelength on a first information recording surface of the first optical disk and, for focusing light emitted from said transmitting and reflecting means with the second wavelength on a second information recording surface of the second optical disk, and for condensing light reflected by one of the first information recording surface and the second information recording surface;

a first photo-detector for receiving light with the first wavelength passing through the first surface and the second surface of said transmitting and reflecting means; and a second photo-detector for receiving light with the second wavelength reflected by the first surface of said transmitting and reflecting means.

* * * * *